United States Patent [19]

Sullivan

[11] Patent Number: 5,774,422
[45] Date of Patent: Jun. 30, 1998

[54] METHOD OF AMPLITUDE SHADING IN THE TIME DOMAIN TO CONTROL SIDE LOBES IN THE FREQUENCY DOMAIN

[75] Inventor: Michael J. Sullivan, Oakdale, Conn.

[73] Assignee: The United States of America as represented by the Secretary of the Navy, Washington, D.C.

[21] Appl. No.: 919,179

[22] Filed: Aug. 15, 1997

[51] Int. Cl.$^6$ .................................................. G01S 15/00
[52] U.S. Cl. ........................................ 367/138; 367/905
[58] Field of Search .................................. 367/131, 138, 367/137, 905, 103

[56] References Cited

U.S. PATENT DOCUMENTS 4,291,396  9/1981  Martin ...................................... 367/154
5,309,409  5/1994  Jones et al. ............................... 367/103

*Primary Examiner*—Ian J. Lobo
*Attorney, Agent, or Firm*—Michael J. McGowan; Prithvi C. Lall; Michael F. Oglo

[57] ABSTRACT

A method of amplitude shading in the time domain is used to control side lobes in the frequency domain. Each of a plurality of limited dynamic range amplifiers is capable of generating a corresponding output with a frequency response when input power is applied thereto. The amplitude of the input power supplied to each amplifier is controlled in accordance with an amplitude shading function in order to modify each of the corresponding amplifier outputs. Each amplifier output is modified such that the width of each main lobe is realized while the side lobes are reduced. The amplitude shading function used by the present method is a one-half cycle $\cos^2$ function with a DC offset.

6 Claims, 2 Drawing Sheets

5,774,422

METHOD OF AMPLITUDE SHADING IN THE TIME DOMAIN TO CONTROL SIDE LOBES IN THE FREQUENCY DOMAIN

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to continuous wave sonar systems, and more particularly to a method of amplitude shading the limited dynamic range amplifiers in the time domain to control side lobes in the frequency domain for use by a continuous wave (CW) sonar system.

(2) Description of the Prior Art

The benefits of amplitude shading continuous wave (CW) pulses in sonar have been known for some time. Modern digital techniques result in very stable systems with extremely sharp filters to provide for CW detection of targets traveling at low speed of only a few knots. Briefly, CW detection relies on the return from the target being Doppler shifted away from the clutter at the transmitted frequency. However, the presence of strong frequency side lobes can mask slow-moving targets which exhibit small Doppler shifts. This is shown graphically in FIG. 1 where transmitted frequency response 10 has a main lobe 12 centered at frequency f and side lobes 14 surrounding main lobe 12. A slow-moving target Doppler return 13 is masked by one of the side lobes 14 because its amplitude is greater than that of return 13. Thus, to obtain an improvement in performance at slow target speeds where only small Doppler shifts are present, the relatively strong frequency side lobes of unshaded CW pulses can be reduced by amplitude shading.

When a CW detection system uses modern linear output amplifiers, amplitude shading in the frequency domain is easily achieved because such linear output amplifiers have a maximum dynamic range which is generally on the order of 40dB or greater. However, many sonar systems use limited dynamic range amplifiers (i.e., maximum dynamic range of less than 20dB) that are generally considered "nonlinear" as they will be referred to hereinafter. Conventional amplitude shading in the time domain, which starts at zero amplitude, cannot be applied to limited dynamic range amplifiers to detect the slow-target, Doppler shifted returns.

SUMMARY OF THE INVENTION

Accordingly, it is an object of the present invention to provide a method of amplitude shading in the time domain to control side lobes in the frequency domain.

Another object of the present invention is to provide a method of amplitude shading for use with a continuous wave detection system that uses limited dynamic range amplifiers.

Other objects and advantages of the present invention will become more obvious hereinafter in the specification and drawings.

In accordance with the present invention, a method of amplitude shading in the time domain controls side lobes in the frequency domain. Each of a plurality of limited dynamic range amplifiers of dynamic range of less than 20dB is capable of generating a corresponding output with a frequency response when input power is applied thereto. In general, the frequency response is defined by a main lobe with a peak output centered at a desired frequency of operation and a plurality of side lobes surrounding the main lobe. The amplitude of the input power supplied to each such amplifier is controlled in accordance with an amplitude shading function in order to modify each of the corresponding amplifier outputs. Each amplifier output is modified such that the chosen width of each main lobe is realized while the side lobes are reduced. The amplitude shading function used by the present method is a one-half cycle cosine$^2$ function with a DC offset. More specifically, the envelope of the amplitude shading function is of the form $R+(1-R)\cos^2\phi$ where $R<1$ and $\phi$ ranges from $-\pi/2$ to $\pi/2$. The value R is representative of a minimum turn-on drive voltage for each such amplifier.

BRIEF DESCRIPTION OF THE DRAWINGS

Other objects, features and advantages of the present invention will become apparent upon reference to the following description of the preferred embodiments and to the accompanying drawings, wherein.

DESCRIPTION OF THE PREFERRED EMBODIMENTS

Figure 2:
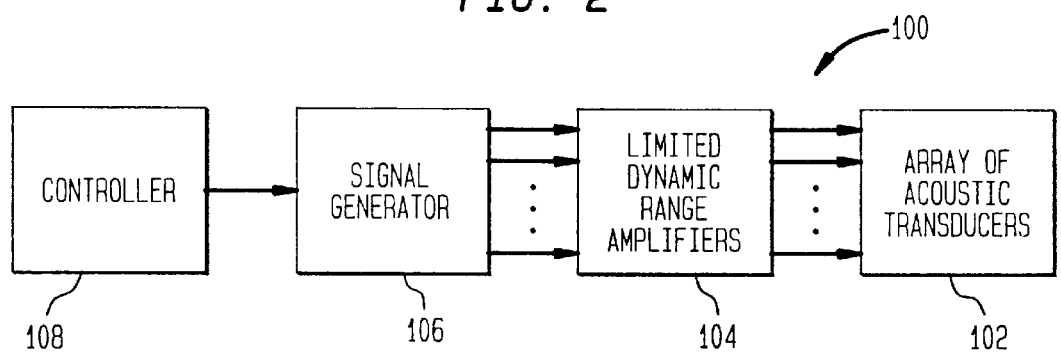
FIG. 2 is a functional block diagram of the system used to carry out the method of the present invention.

Referring now to the drawings, and more particularly to FIG. 2, a block diagram of a system used to carry out the method of the present invention is shown and referenced generally by numeral 100. System 100 includes an array of acoustic transducers 102 for outputting transmission (e.g., acoustic pulses) when driven by a corresponding plurality of limited dynamic range amplifiers 104. For purpose of the present invention, a limited dynamic range amplifier is one having a maximum dynamic range of less than 20dB and is therefore generally considered to be nonlinear. Input power supplied to one of such amplifiers 104 is generated by signal generator 106 as controlled by controller 108 which is operated in accordance with the method of the present invention.

Figure 1:
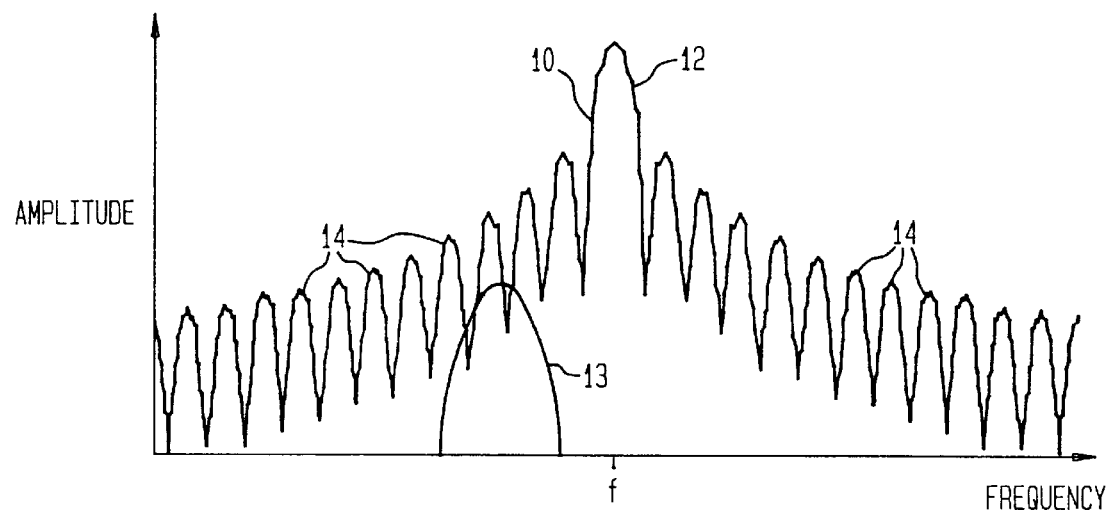
FIG. 1 is a graph of amplitude versus frequency showing a plot of a transmitted acoustic wave and a Doppler return from a slow-moving target being masked by the side lobes of the transmitted wave.
Figure 3:
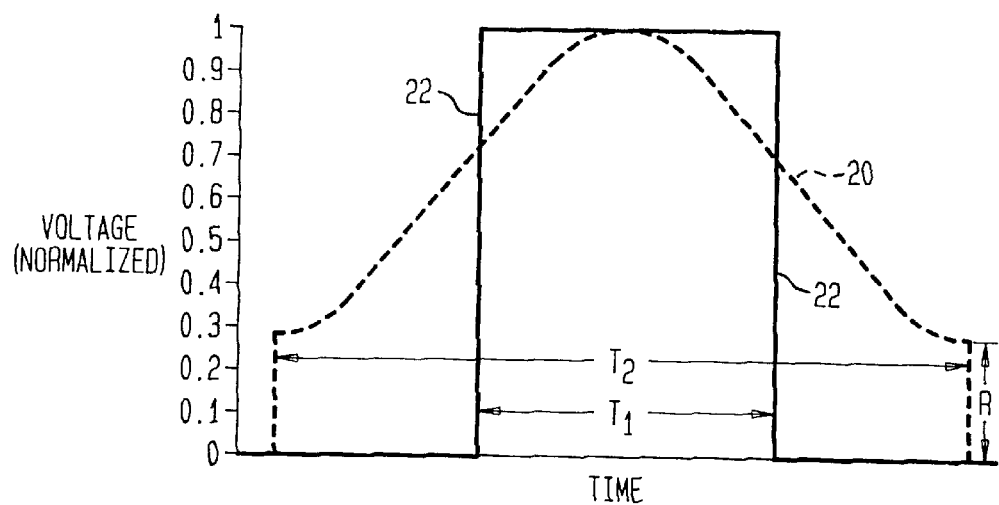
FIG. 3 depicts a normalized voltage versus time graph of the amplitude shading function of the present invention.

Referring again to FIG. 1, the output of each of such amplifiers such as 104 has a frequency response 10 generated when amplifier 104 is turned on and then off where full input power is applied and then removed. The function governing this kind of application of the input power can be modeled as a square wave pulse that lasts for a specified time referred to herein as $T_1$ as shown in FIG. 3. Frequency response 10 is defined by main lobe 12 with its peak output centered at a desired frequency of operation f. A plurality of side lobes 14 surround main lobe 12. The method of the present invention realizes main lobe 12 while reducing side lobes 14 so that return 13 is not masked by the side lobes of the amplifier's output.

In general, controller 108 controls signal generator 106 to control how input power is supplied to each amplifier 104.

In the present invention, controller 108 applies an amplitude shading function to signal generator 106 to control how the input power is supplied to each of amplifiers 104. The present invention applies a cosine$^2$ function that starts at a DC voltage offset. The envelope of the shading function of the present invention is of the form R+(1−R)cos$^2\phi$ where R represents a minimum turn-on drive voltage for each of amplifiers 104 that has been normalized to 1 volt, and where $\phi$ ranges from −π/2 to π/2 in order to cover one-half cycle of the cosine$^2$ function. The minimum turn-on voltage R is defined herein as the minimum voltage required to start-up each of amplifiers 104. That is, below this minimum, there is insufficient input voltage to allow amplifier 104 to produce an output. This expression is shown graphically in FIG. 3 where curve 20 represents the amplitude shading function controlling the input power and curve 22 represents a square wave pulse lasting for the specified $T_1$.

In the past, amplitude shading of amplifiers such as 104 was not performed because of the inherent energy reduction and widening of the main lobe of the transmitted pulse. However, both of these problems are overcome in the present invention by increasing the time over which the input power is applied to an amplifier 104 relative to the specified time $T_1$ over which amplifiers are normally switched on and then off to generate an output pulse of specified output energy $E_1$. Referring again to FIG. 3, the time $T_2$ (during which curve 20 controls the input power) is greater than $T_1$.

To maintain system performance, the output pulse produced when input power is controlled in accordance with curve 20 should have as much energy as the output pulse generated when input power is supplied in accordance with curve 22. In other words, if the energy of the output pulse produced when input power is controlled by R+(1−R)cos$^2\phi$ is denoted $E_2$, $T_2$ should be determined such that $E_1 \approx E_2$.

Since energy is power (P) multiplied by time (T) and P is proportional to voltage squared (V$^2$), the integral $$\int_0^T V^2 dt$$

should be the same for the output pulse produced when either curve 20 or curve 22 is used to control the input power to amplifier 104. The integral of a square wave normalized to 1 over ±π/2 is π and is proportional to the energy in a non-shaded envelope. To calculate how much longer the shaded envelope must be to have the same energy as the non-shaded envelope, one must determine the time $T_2$. The time $T_2$ can be approximately determined from the relationship $$T_2 = \frac{T_1 \pi}{\int_{-\pi/2}^{\pi/2} [R + (1-R)\cos^2\phi]^2 d\phi} \quad (1)$$

By way of a non-limiting example, the present method will now be explained for use with a sonar system such as the U.S. Navy's AN/SQS-53A/B sonar systems because these sonar systems possess limited dynamic range amplifiers as defined herein. However, it is to be understood that the present method can be applied to any system such as 100 of FIG. 2 as is readily apparent from the general application description.

Figure 4:
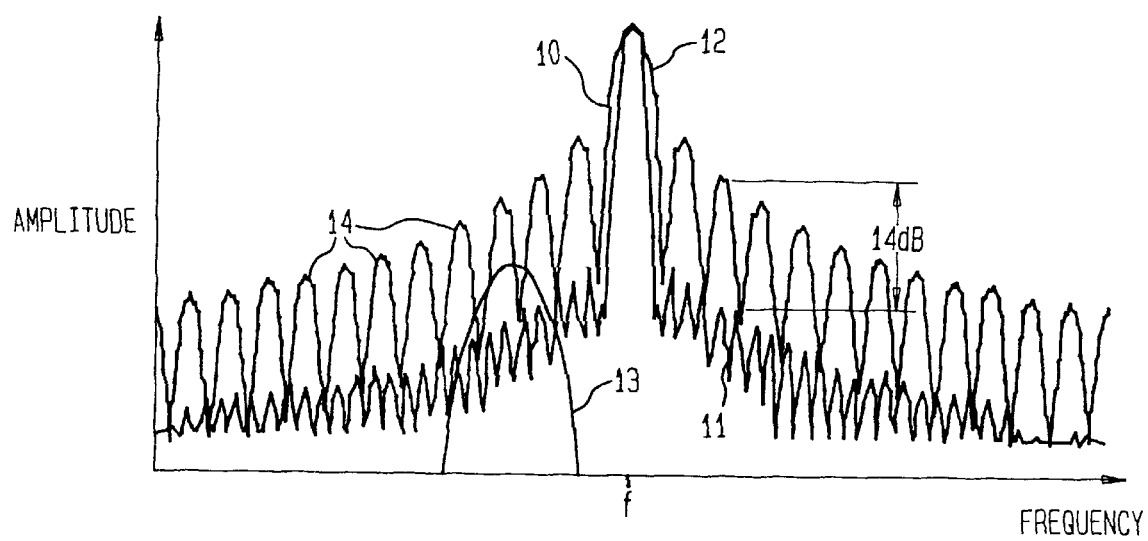
FIG. 4 is a graph of amplitude versus frequency showing a plot of an unshaded transmitted acoustic wave, a transmitted acoustic wave shaded in accordance with the present invention, and a Doppler return from a slow-moving target.

The minimum turn-on voltage for the amplifiers used in this Navy system is −13dB below the maximum drive level, or 0.22 volts normalized to 1 volt. However, since −13dB is the lower limit at which the amplifiers turn on, −11dB was chosen as the starting level to insure that all amplifiers would turn on for repeatable results. The −11dB starting level is 0.28 volts normalized to 1 volt. As shown in FIG. 4, adding the −11dB DC offset or pedestal to the (1−00.28)cos$^2\phi$ function produced −27dB side lobes in (shaded) transmitted frequency response 11 compared to the −13dB side lobes of the spectrum from an (unshaded) transmitted frequency response 10. This 14dB improvement means that Doppler return 13 is not masked by (shaded) transmitted frequency response 11.

Applying equation (1) resulted in a time $T_2$ of 2.1 seconds. However, when tested, a length of 2.28 seconds (resulting in 108% of the energy of a 1-second ($T_1$) unshaded window) was chosen. The slightly longer-than-required length for equal energy was chosen to ease programming implementation in the AN/SQS-53A.

The advantages of the present invention are numerous. The method allows limited dynamic range amplifiers to be amplitude shaded in the time domain in order to control transmission side lobes in the frequency domain. The method will immediately be useful to the U.S. Navy by allowing existing CW sonar equipment to track slow moving targets. The method can be adapted for a variety of limited dynamic range amplifiers by simply accounting for the particular (normalized) minimum turn-on voltage of the amplifiers.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of amplitude shading in the time domain to control side lobes in the frequency domain, comprising the steps of:

providing a plurality of limited dynamic range amplifiers, each of said plurality of limited dynamic range amplifiers generating a corresponding output with a frequency response when input power is applied thereto, said frequency response defined by a main lobe with a peak output centered at a desired frequency of operation and a plurality of side lobes surrounding said main lobe; and controlling amplitude of said input power to each of said plurality of limited dynamic range amplifiers in accordance with an amplitude shading function to modify each said corresponding output such that the width of each said main lobe is realized while said plurality of side lobes surrounding each said main lobe are reduced, said amplitude shading function being a one-half cycle cos$^2$ function with a DC offset.

2. A method according to claim 1 wherein said amplitude shading function is of the form R+(1−R)cos$^2\phi$ where R<1 and $\phi$ ranges from −π/2 to π/2.

3. A method according to claim 2 wherein said amplitude shading function is applied for a period of time $T_2$ that is approximately determined in accordance with the relationship $$T = \frac{T_1 \pi}{\int_{-\pi/2}^{\pi/2} [R + (1-R)\cos^2\phi]^2 d\phi}.$$

4. A method of amplitude shading in the time domain to control side lobes in the frequency domain, comprising the steps of:

providing a plurality of limited dynamic range amplifiers, each of said plurality of limited dynamic range amplifiers generating an output pulse with a frequency response when a pulse of input power is applied thereto, said frequency response defined by a main lobe of chosen bandwidth with a peak output centered at a desired frequency of operation and a plurality of side lobes surrounding said main lobe, wherein an energy $E_1$ associated with said output pulse is produced when said pulse of input power is transmitted for a time duration $T_1$; and controlling amplitude of said pulse of input power to each of said plurality of limited dynamic range amplifiers in accordance with an amplitude shading function to modify each said output pulse such that the width of each said main lobe is realized while said plurality of side lobes surrounding each said main lobe are reduced, said amplitude shading function being a one-half cycle $\cos^2$ function with a DC offset applied over a period of time $T_2$ that is greater than said time duration $T_1$ while an energy $E_2$ of said output pulse so modified is approximately equal to said energy $E_1$.

5. A method according to claim 4 wherein said amplitude shading function is of the form $$R+(1-R)\cos^2\phi$$

where R is representative of a minimum turn-on voltage for each of said plurality of limited dynamic range amplifiers, said minimum turn-on voltage being normalized to 1 volt, and where $\phi$ ranges from $-\pi/2$ to $\pi/2$.

6. A method according to claim 5 wherein said time duration $T_2$ is approximately determined in accordance with the relationship $$T_2 = \frac{T_1\pi}{\int_{-\pi/2}^{\pi/2} [R + (1-R)\cos^2\phi]^2 d\phi}.$$

\* \* \* \* \*